Sept. 12, 1967  K. L. JOHNSON  3,340,920

PREVAILING TORQUE LOCKNUT

Filed Nov. 6, 1964

INVENTOR
KENNETH L. JOHNSON

BY Green, McCallister &
Miller

HIS ATTORNEYS

3,340,920
PREVAILING TORQUE LOCKNUT
Kenneth L. Johnson, 951 Garden City Drive,
Monroeville, Pa. 15146
Filed Nov. 6, 1964, Ser. No. 409,391
9 Claims. (Cl. 151—21)

This invention relates to fasteners in the nature of locknuts and particularly to prevailing torque nuts and a method of making them.

My improved prevailing torque locknut is characterized by its ability to accept a full range of tolerance variations with a low initial torque, and more than adequate reuseability—the standard industrial indicia of locknut performance.

It is the function of a locknut to grip the threaded shank of a cooperating bolt with sufficient force to resist the relatively small forces that tend to cause backing off or loosening of the nut. These forces result from vibration and other dynamic loadings that tend to temporarily relieve some of the axial load on the nut and small rotational or non-axial loads or displacements of the parts connected by the nut and bolt. The holding force required is relatively small as seen from the current industrial standards which, for example, pass locknuts of a ⅜-16 thread having an application (or holding) torque of only 8½ inch pounds after five separate applications.

Locknuts generally employ a deformed thread (radially, axially or both) that causes an interference or metal-moving fit with the threads of a cooperating bolt. Those skilled in the art appreciate that the development of holding torque by any adequate deformation is not a difficult task.

Quality in a locknut thus is not measured by its ability to develop holding torque, except as to minimum standards, but is determined by more subtle and difficult to obtain ancillary characteristics.

Locknuts employed on an assembly line ideally should be capable of adequate performance throughout a wide range of tolerance variations. For example, a nut with maximum tolerance bore must develop adequate holding torque when applied to a bolt having a minimum tolerance shank and a nut having a minimum tolerance bore must be useable with a bolt of maximum tolerance shank. It is well known that the wider the tolerance range, the cheaper the overall cost.

On assembly lines, pre-set powered torque wrenches are employed to apply locknuts and the holding torque developed in extreme tolerance situations is particularly important. The locknuts are tightened to the predetermined torque which results from a combination of holding torque developed by the nut on the bolt, and tightening torque developed by the gripping action of the nut and bolt on the part held thereby. The variation in holding torque due to tolerance variations results in the development of more or less gripping force—the ultimate object of the fastener in the first place.

Another measure of quality in a locknut is its ability to develop adequate holding torque after repeated applications. Repeated applications of a locknut tend to destroy the set deformation of the nut bore and also wear away the nut threads. Although actual reuse of locknuts is fairly uncommon, this measure of quality indicates the behavior capability of a locknut under a wide range of situations such as use on a long bolt requiring traversal of a long thread length. Along with specifications as to the minimum holding torque developed after five standard applications, the industry specifies, for example, that the initial torque required for application of a ⅜-16 nut shall not be more than 80 inch pounds. It is thus necessary for a locknut to retain at least one-tenth of its initial holding torque after five applications. Surprisingly enough this is a difficult standard to meet.

A further measure of quality in a locknut is its ability to perform adequately while requiring as low an initial torque as possible. Low initial torque is somewhat related to the factors discussed above. In addition to those factors, it is desirable for the prevention of thread damage as caused by excess wear and seizing due to excessive frictional forces inherent in an initial torque or holding torque.

It has thus been an object of this invention to fully investigate the industrial need for quality features in a prevailing torque lock nut;

Another object of this invention has been to devise and develop a locknut capable of performing adequately throughout a wide range of tolerance variation;

Another important object of this invention has been to devise and develop a locknut having a comparatively low initial torque but meeting all of the accepted industrial specifications;

A further object of this invention has been to devise and develop a locknut having locking characteristics that change a relatively small amount upon extensive or repeated usage;

These and other objects of this invention will become more apparent to those skilled in the art upon reading and understanding the following description of the novel concepts of my invention and of some practical embodiments thereof, and the appended claims.

I have determined that the problem of tolerance range, reusability and low initial holding torque are all solvable by maximizing the flexibility of the nut body as related to the deformation required in the application of the nut to a bolt. By maximum flexibility, it is meant maximum deformation per unit force without exceeding the elastic limits of the material at any point in the nut. Plastic deformation of the nut body, or a portion thereof occurring upon application of the nut to a bolt is a major failure of common locknuts showing up primarily as excess initial torque and rapid loss of holding torque upon re-application. Locknuts must have outer configurations that conform to the standard specification for wrenching purposes. Accordingly, locknut construction must take into account limitations inherent in standard nut shapes such as hexagonal and square. I have determined that fully elastic response of a nut having a standard basic configuration requires elastic flexure of substantially the entire nut body as opposed to localized areas, for example, adjacent the threads. Movement of localized areas adjacent the thread without flexure of the entire nut body results in undesirable plastic deformation of the nut in the very regions where locking forces are developed. Accordingly, the locknut of this invention is constructed to maximize the flexibility of the entire nut body at least throughout the axial locking portions thereof.

To accomplish the desired maximum flexibility, the locknut of this invention is deformed into a two axis asymmetry only, so as to ovalize the threaded bore with respect to the nut periphery. The ovalized threaded bore is oriented, with respect to the nut periphery, such that the point of maximum bending moment (which falls 90° from the minor axis of the oval, due to the asymmetry of the two axes) occurs at a cross section of minimum wall thickness or moment of inertia to thereby provide maximum flexibility of the nut body as a unit. This flexibility permits the nut to deform elastically a maximum amount per unit force and thus accommodate a large range of tolerance variation without exceeding the elastic limit of the nut material at any point.

In this regard it should be pointed out that a hexagonal locknut exists in the prior art having an ovalized bore that is oriented with respect to the periphery such that a maximum wall thickness or moment of inertia occurs at the point of maximum bending moment. The prior art locknut is much less flexible than the locknut of this invention for this reason.

Another important concept of this invention involves the formation of an elliptical or near elliptical bore shape such that substantially no flat threaded surfaces are presented to the cooperating bolt. I have determined that force exerted on opposed corners of a hexagonal nut will produce a smoothly rounded distortion of the bore which can conform to a cooperating bolt much more completely than a flat surface. A greater degree of conformity permits the expanding loading that occurs during the insertion of a bolt to be distributed through a larger area of material thus minimizing the possibility of plastic deformation of the bore threads due to excess loading. Also, I have determined that upon deformation of the near elliptical bore, the bore will tend to recircularize, thus distributing the expanding force over an ever increasing surface area as the force increases.

The advantages of improved flexibility are cumulative in that in addition to the wide range of tolerances acceptable, the lack of plastic deformation, and the low initial torque required to produce adequate reusability, these factors further enhance the reusability by minimizing thread wear due to high initial loading. Furthermore, the locking action is accomplished by purely radial clamping action which is in no way disturbed by the axial force devolped when the nut is tightened onto a part. Many existing locknuts include a bit of axial deformation which contributes greatly to the initial torque but is lost during initial tightening so as not to contribute correspondingly to the holding force.

These novel concepts will be more fully understood from the following description of some preferred embodiments of my invention wherein specific reference is made to the accompanying drawings of which:

Figure 1:
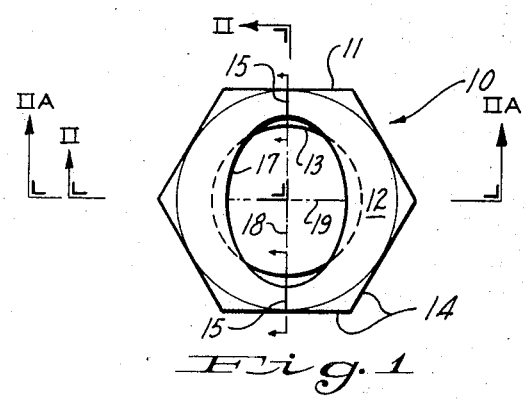
FIGURE 1 is an enlarged top or plan view of a locknut constructed in accordance with this invention showing the details thereof in somewhat exaggerated form for ease of understanding.
Figure 2:
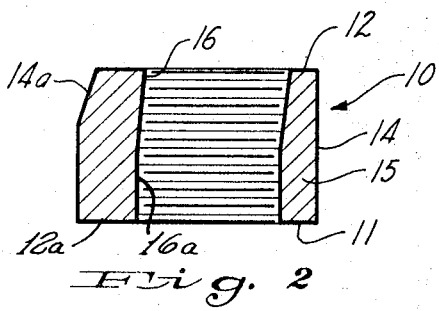
FIGURE 2 is an elevational cross sectional view of the locknut shown in FIGURE 1 taken along line II—II thereof.

FIGS. 1 and 2 show a self-tensioning fastener or prevailing torque locknut 10 constructed in accordance with my invention. The locknut 10 has a body 11 including a substantially uniformly-upwardly-facing or continuous top face 12, a substantially continuous or planar bottom face 12a, and having a centrally located axially extending bolt-receiving portion or threaded bore 13 therethrough. The locknut 10 further has six lateral or side faces 14 that intersect the top face 12 and define a polygonal or hexagonal periphery in vertical projection. The hexagonal periphery of the facing 14 combined with the threaded bore 13 and the substantially uniformly-upwardly facing top face 12 establish a side wall having a plurality of zones or cross sections 15 of minimum wall thickness and minimum resistance to elastic bending.

The threaded bore 13 is distorted particularly at one axial end portion 16 to a peripherally oval or elliptical configuration 17 as best seen in FIGURE 1. The distortion preferably is gradual along upper length portion 16 of the bore into a lower circular shaped bore portion 16a, as shown in FIGURE 2. The oval configuration 17 has major and minor axes respectively 18 and 19. The major axis 18 is substantially aligned with opposed zones 15 of minimum cross section such that forces applied in the region of the minor axis 19 will result in maximum deflection of the nut body per unit force applied due to the insertion of a bolt. This result is assured by locating the zone 15 at the point of maximum bending moment, i.e., longest moment arm. The bending moment, itself, is maximized by the two axis asymmetrical oval configuration 17 which assures a maximum 90° moment arm within the limits of the standard nut configuration.

Figure 3:
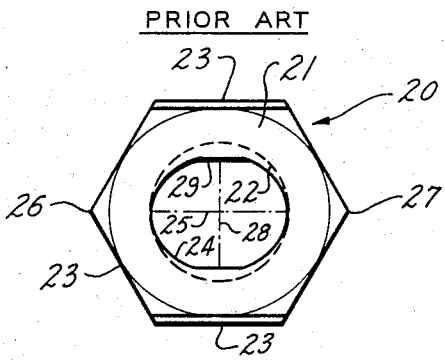
FIGURE 3 is an enlarged top or plan view of a prior art locknut having the details thereof somewhat exaggerated for ease of understanding.

The locknut 10 thus far described is to be contrasted with the prior art locknut 20 as shown in FIGURE 3. The locknut 20 has a body 21 having a threaded bore 22 therethrough and a plurality of lateral or side faces 23 that define a hexagonal periphery. The threaded bore 22 is distored or flattened adjacent one axial end portion into an ovalized periphery 24 having a major axis 25 that is oriented in line with a pair of opposed corner portions 26 and 27 of the nut body 21 and a minor axis 28 that is aligned with opposed side faces 23. The maximum bending moment resulting from expanding forces applied in the region of the minor axis 28 will occur at cross section of maximum thickness and maximum moment of inertia, i.e., the cross sections adjacent opposed corners 26 and 27. The comparative result is less flexibility than the locknut shown in FIGURE 1 and the disadvantages inherent therein as heretofore described. Furthermore, the prior art locknut 20 is formed by the application of distorting force along two opposed side faces 23 resulting in substantially flat peripheral segments 29 in the region of the minor axis 28. The flat segments 29 tend to concentrate expanding forces at a point rather than over a significant area and thus encourage plastic thread deformation. On the other hand, the locknut 10 of FIGURE 1 is formed, as hereinafter described, by distorting force applied across opposed corners in alignment with the minor axis 19. Maximum bending and plastic deformation occurs at the minimum wall thickness sections 15 adjacent axis 18, resulting in a squashing of the nut body rather than penetration of displaced metal. The nature of the distortion throughout the relatively thicker section adjacent these corner portions is such that the oval peripheral configuration 17 is more nearly elliptical, or in other words has curved rather than flat segments in the region of the minor axis 19. These curved segments tend to distribute expanding force from a bolt over a sufficient area to minimize or eliminate plastic thread deformation.

Figure 4:
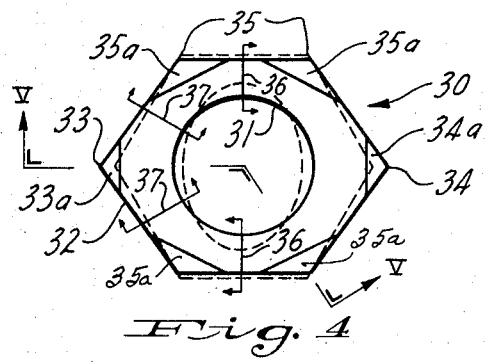
FIGURE 4 is an enlarged top or plan view of an intermediate production stage in the manufacture of locknuts in accordance with a preferred embodiment of this invention.
Figure 5:
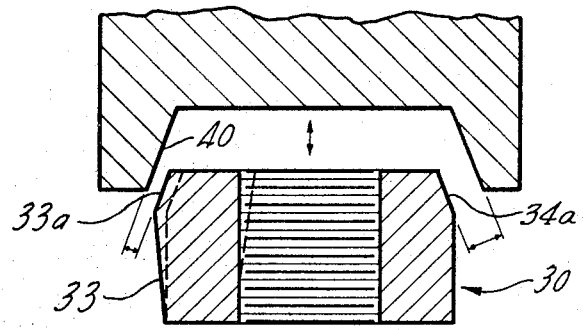
FIGURE 5 is a somewhat schematic elevational cross sectional view of the intermediate stage nut shown in FIGURE 4 and a forming tool for cooperating therewith.

FIGURES 4 and 5 show in full lines a preferred embodiment of this invention in an intermediate stage of production. The final configuration of the nut is shown in broken lines. The intermediate of FIGURES 4 and 5 comprises an intermediate body 30 having a generally cylindrical threaded bore 31 extending therethrough. The body 30 has six side faces that form a slightly elongated, near or substantially hexagonal periphery having four of the six side faces outwardly inclined (see the opposed right and left-hand faces of FIGURE 4).

The axis of side wall elongation passes through two opposed corners 33 and 34. For purposes of manufacturing ease, the upper edges of the corners 33 and 34 as well as the remaining corners 35 are chamfered at an angle of approximately 20° to the vertical to provide upwardly-inwardly sloped faces or surface portions 33a, 34a and 35a respectively. The surface portions 33a and 34a are shown as opposed force application surfaces at corner areas of the sides of the fastener and spaced further from the axis of the threaded bore 31 than the surface portions 35a to establish a preset asymmetry having a major axis that is aligned with the opposed corners 33 and 34. As shown in FIGURE 5, a substantially uniform conical tool or die 40 is cooperable with the preset asymmetry of the nut intermediate 30 to automatically engage only opposed force receiving surface portions 33a and 34a and exert radial-inward plastic deforming force thereon. Note the relative distance indicated by dimension lines in FIGURE 5. Pressing of the nut intermediate 30 into the tool 40 thus distorts the nut intermediate into its desired final shape as shown by the broken lines in FIGURES 4 and 5. It should be noted that the use of an asymmetrical nut surface distorted by a symmetrical forming tool eliminates the need for orientation of the nut prior to forming. The orientation of the first deformation is controlled strictly by the preset asymmetry of the nut intermediate itself.

The use of an initially asymmetrical nut intermediate like that shown in the full lines of FIGURES 4 and 5 permits the final locknut exterior shape to be truly hexagonal within standard accepted tolerance limits. In addition, the wall thickness at maximum bending zones 36 is slightly less than the wall thickness at intermediate zones 37 to further increase the flexibility of the nut body.

Figure 2A:
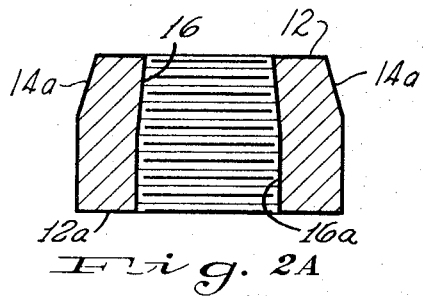
FIGURE 2A is a section in elevation on the scale of FIGURE 2 and taken along the line IIA—IIA of FIGURE 1.
Figure 2B:
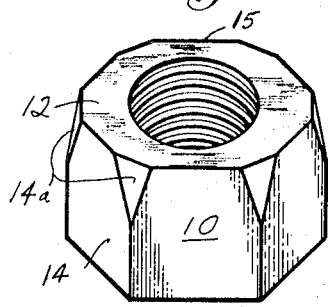
FIGURE 2B is an isometric view in elevation on the scale of FIGURES 1 to 2A, taken in the same direction as the nut of FIGURE 1 and illustrating a form of finished nut of my construction.

It will be noted that in a finished locknut 10, as shown in FIGURES 1 to 2B, inclusive, I have shown the upper corners of the side faces 14 as connected by inwardly-upwardly sloped planar auxiliary faces 14a that extend from a bottom apex defined by the edges of an adjacent pair of vertical or side planar faces 14 and that widen into the top planar face 12. The faces 14a are important, particularly at opposite sides of the nut (see 33a and 34a of FIGURE 4) which are to be deformed in forming the final configuration or body shape from a preliminary or intermediate form or shape illustrated in FIGURES 4 and 5. The other opposite pair of faces 14a which corresponds to the faces 35a of FIGURE 4 may be employed as holding faces during the deforming operation and in the finished nut give it a uniform appearance effect.

In first forming the intermediate nut body 30, see the preliminary configuration of the full lines of FIGURES 4 and 5, the end or upper area that is to constitute the locking area is provided with an elongated-oblong or asymmetrical outer shape and its threaded bore 31 is provided with a cylindrical shape. In the final forming operation, the outer or surrounding peripheral area of the nut 10 becomes cylindrical or symmetrical in shape, and the inner bore upper area assumes an oblong-elongated or asymmetrical shape. In addition to other advantages previously mentioned, this imparts a memory to the metal of the nut, such that it will flexibly and without plastic deformation, tend to move towards the preliminary shape adjacent its top area when it is tightened or screwed-down on a cooperating bolt. This memory action is greatly facilitated or assured by the fact that the finished nut shape 10 is of lesser thickness 15 or in the direction of its major axis 18. Galling and seizing of the nut is eliminated. Since the flexing of the nut acts through the greatest possible distance of the section of the nut, as represented by the axis 18 of FIGURE 1, forces are substantially equalized throughout its upper rim-like area to produce an equalized locking action.

The crimping operation of FIGURE 5 causes portions of the threads of the bore along opposite sides thereof that are in alignment with the axis of opposed pressing-in force application to move inwardly towards each other and provide a lessened distance therebetween, such that these threads and corresponding portions of the bore are distorted inwardly towards the end of the nut (the upper end of FIGURE 5) adjacent which the forces are applied. At the same time, opposed portions of the threads and the bore that lie along a transverse axis that is normal or perpendicular to the force application are lengthened to provide an increased distance therebetween.

It will thus be appreciated by those skilled in the art that I have devised and developed a new, useful and unobvious lock nut and procedure for making it. While a specific embodiment of my invention has been shown herein for purposes of illustration, it is to be understood that various modifications can be made without departing from the novel concepts disclosed herein.

To more particularly and distinctly point out the scope and conceptual limits of my invention, I claim:

1. In a prevailing torque fastener comprising a body having six side faces that define a substantially hexagonal periphery, a central threaded bore, and a uniformly-upwardly-facing top face that intersects the side faces and terminates radially inwardly thereof adjacent the threaded bore, the top face, side faces, and threaded bore defining, in the body, a side wall extending substantially the entire axial length of the threaded bore and having a peripherally varying effective wall thickness including peripherally spaced zones of minimum wall thickness; a resilient locking construction comprising: at least an axial portion of the threaded bore adjacent one end thereof being substantially elliptical in peripheral configuration and defining major and minor axes, said major axis being substantially aligned with a pair of the zones of minimum wall thickness, said minor axis being aligned with two opposed corner areas of the hexagonal periphery, said two opposed corner areas having opposed force application surfaces adjacent said one end extending radially-inwardly of the top face, and the radial wall thickness of the fastener body at said two opposed corner areas being greater than that of each of the remaining corner areas of the fastener, with the external dimensions of the fastener being of standard size.

2. In a prevailing torque fastener in the nature of a finished locknut comprising, a body having substantially planar vertical side faces that define a polygonal periphery thereabout, top and bottom faces connected with the side faces, a threaded bore extending axially-centrally through said body and open to the top and bottom faces, the top and bottom faces and the threaded bore defining in the body a side wall extending substantially the entire axial length of the threaded bore and having a peripherally varying effective wall thickness including peripherally spaced zones of minimum wall thickness at at least a portion of the threaded bore; an improved locking construction wherein: the planar vertical side faces of polygonal periphery are of symmetrical standard shape about the body, at least an axial portion of the threaded bore adjacent one end thereof is substantially elliptical-shaped in peripheral configuration and defines major and minor axes, said major axis is substantially aligned with a pair of zones of minimum wall thickness and said minor axis is aligned with two opposed corner areas of the polygonal periphery, a pair of opposed force application surfaces extend radially-inwardly upwardly contiguous with the top face from said two opposed corner areas along the minor axis, the radial wall thickness of the body at said two opposed corner areas is greater than remaining corner areas thereof, and the threaded bore has a circular-shaped bore portion extending inwardly from the bottom face and connected with the substantially elliptical-shaped bore portion, whereby a threaded bolt may be entered within the circular-shaped bore portion and advanced therealong towards the top face to engage the substantially elliptical-shaped bore portion and flex it radially for providing a flexible locking action with the threaded bore.

3. In a prevailing torque fastener as defined in claim 2 wherein said pair of opposed force application surfaces are sloped radially-upwardly from adjacent side faces at said two opposed corner areas of the side faces.

4. A prevailing torque fastener as defined in claim 3 wherein all of the corner areas of the side faces of the nut have surfaces extending radially-inwardly of the top face and sloped radially-upwardly from adjacent side faces.

5. In a prevailing torque fastener as defined in claim 2 wherein the body has an imparted inherent memory characteristic towards a substantially elliptical outer shape along the minor axis that facilitates the flexible locking action when the threaded bolt is advanced within the threaded bore.

6. In a prevailing torque fastener as is defined in claim 2 wherein the outer periphery defined by the side faces of the body initially has a substantially elliptical shape whose elongation is along a then major and now the minor axis from the top face, the threaded bore initially has a circular-shape fully therealong, and the initially-shaped body is deformed radially-inwardly to provide the final body of symmetrical outer shape thereabout and the substantially elliptical-shaped bore portion, whereby the final body has a memory characteristic imparted thereto that facilitates the flexible locking action effected by the advance of a threaded bolt within the threaded bore.

7. In a prevailing torque fastener in the nature of a finished locknut comprising, a body having substantially planar vertical side faces that define a polygonal periphery thereabout, a central threaded bore, and an upwardly-facing top face that intersects the side faces and terminates radially-inwardly thereof adjacent the threaded bore; the top face, side faces, and threaded bore defining in the body a side wall extending substantially the entire axial length of the threaded bore and having a peripherally varying effective wall thickness including peripherally spaced zones of minimum wall thickness at least at a portion of the threaded bore; a resilient locking construction comprising: at least an axial portion of the threaded bore adjacent one end thereof being substantially elliptical in peripheral configuration and defining major and minor axes, said major axis being substantially aligned with a pair of zones of minimum wall thickness and said minor axis being aligned with two opposed corners of the polygonal periphery, said two opposed corners having opposed force application surfaces adjacent said one end sloping radially-upwardly from said two opposed corners and extending radially-inwardly of the top face, and the radial thickness of the body at said two opposed corners being greater than that of each of the remaining corners of the fastener, with the external dimensions of the body of the fastener being of standard size.

8. In a prevailing torque fastener as defined in claim 7 wherein, the body has a bottom face and the centrally threaded bore has a circular-shaped bore portion extending inwardly from the bottom face, and said substantially elliptical axial portion slopes substantially uniformly-gradually into said circular-shaped bore portion.

9. In a prevailing torque fastener as defined in claim 7 wherein the peripherally varying effective wall thickness including the peripherally spaced zones of minimum wall thickness is defined by a portion of the body that extends from the top face axially along the threaded bore.

References Cited
UNITED STATES PATENTS

| | | | |
|---|---|---|---|
| 1,516,716 | 11/1924 | Cole | 151—21 |
| 2,337,030 | 12/1943 | Cole | 151—21 |
| 3,171,459 | 3/1965 | Storch | 151—21 |
| 3,208,494 | 9/1965 | Skidmore | 151—21 |

FOREIGN PATENTS 969,618    5/1950    France.

CARL W. TOMLIN, *Primary Examiner.*

R. S. BRITTS, *Assistant Examiner.*